United States Patent
Chen

(10) Patent No.: US 8,355,616 B2
(45) Date of Patent: Jan. 15, 2013

(54) OPTICAL FIBER COMMUNICATION CONVERSION DEVICE AND INSTALLING METHOD THEREOF

(75) Inventor: Yu-Hsin Chen, Keelung (TW)

(73) Assignee: Connection Technology Systems Inc., Taipei Hsien (TW)

(*) Notice: Subject to any disclaimer, the term of this patent is extended or adjusted under 35 U.S.C. 154(b) by 328 days.

(21) Appl. No.: 12/760,270

(22) Filed: Apr. 14, 2010

(65) Prior Publication Data

US 2011/0211798 A1    Sep. 1, 2011

(30) Foreign Application Priority Data

Feb. 26, 2010  (TW) .............................. 99105575 A

(51) Int. Cl.
*G02B 6/00* (2006.01)
(52) U.S. Cl. ......... 385/135; 385/134; 385/136; 385/137
(58) Field of Classification Search .................... None
See application file for complete search history.

(56) References Cited

U.S. PATENT DOCUMENTS 5,646,775 A    7/1997   Delrosso et al.
5,668,911 A *  9/1997   Debortoli ................ 385/135
2006/0153516 A1  7/2006  Napiorkowski et al.

FOREIGN PATENT DOCUMENTS

JP         2005024760         1/2005

OTHER PUBLICATIONS

European Search Resport was searched on Nov. 10, 2010.

* cited by examiner

*Primary Examiner* — Uyen Chau N Le
*Assistant Examiner* — Chad Smith
(74) *Attorney, Agent, or Firm* — WPAT PC; Justin King

(57) ABSTRACT

An installing method of an optical fiber communication conversion device is provided. The installing method includes the following steps. Firstly, a housing is provided. An opto-electronic converting module with a first cable winding structure is selectively accommodated and installed within the housing. An optical fiber wiring process is performed. If the opto-electronic converting module is provided and installed within the housing, an optical fiber cable managing function is implemented by the first cable winding structure. If the opto-electronic converting module is not installed within the housing, the optical fiber cable managing function is implemented by a second cable winding structure within the housing. The optical fiber communication conversion device using the installing method is also provided.

7 Claims, 6 Drawing Sheets

OPTICAL FIBER COMMUNICATION CONVERSION DEVICE AND INSTALLING METHOD THEREOF

FIELD OF THE INVENTION

The present invention relates to an optical fiber communication conversion device, and more particularly to an optical fiber communication conversion device having an optical fiber cable managing function. The present invention also relates to a method for installing the optical fiber communication conversion device.

BACKGROUND OF THE INVENTION

Optical fiber can be used as a medium for networking or telecommunication because it is advantageous for high-speed and long-distance communication of optical information. Recently, the optical fiber communication gradually replaces the conventional copper-based communication. The optical fiber communication has more and more applications such as the internet, cable televisions, IP phones, electric meter/water meter reading checks, or the like that can be integrated into optical communication equipment. As such, the applications of the optical fiber communication are continuously expanded and closely linked to household or daily lives.

For designing a new building, a fiber to the home (FTTH) architecture is usually taken into consideration. According to the FTTH technology, a wiring process has been previously done to deploy optical fiber cable directly to the user terminals. While executing the wiring process of the optical fiber cable, it is usually difficult to determine in advance whether the optical fiber communication equipment is used for each user terminal and the actual usage requirements. On the other hand, since the optical fiber is costly and fragile and is made by specified material properties, the optical fiber cable is not usually trimmed at the construction site. As such, after the wiring process of the optical fiber cable is finished, a surplus optical fiber cable is retained and an additional cable manager is used to protect and store the surplus optical fiber cable.

FIG. 1 is a schematic perspective view illustrating a cable manager for managing an optical fiber cable according to the prior art. As shown in FIG. 1, the cable manager 1 comprises a housing 11, a cable winding structure 12 and a perforation 13. The perforation 13 is formed in the housing 11, so that the optical fiber cable 5 could be introduced into the internal portion of the cable manager 1 through the perforation 13.

For performing an optical fiber wiring process, the cable manager 1 is firstly installed on a proper location of a wall (not shown). Then, the optical fiber cable 5 is introduced into the internal portion of the cable manager 1 through the perforation 13 and wound around the cable winding structure 12. As such, after the wiring process of the optical fiber cable 5 is finished, the surplus optical fiber cable 5 will be managed, accommodated and protected within the cable manager 1.

Once the user intends to additionally install optical communication equipment or optical fiber communication conversion device (not shown), the optical fiber cable 5 needs to be partially or completely pulled out of the cable manager 1, and then connected to or re-installed in the optical communication equipment or optical fiber communication conversion device. In this situation, the cable manager 1 needs to be disposed beside the new equipment, or the cable manager 1 is not used.

For solving the drawbacks, some literatures have been disclosed as follows.

For example, Chinese Utility Patent No. 2932415 disclosed an optical fiber cable managing device. The optical fiber cable managing device is fixed on a circuit board. In addition, electronic components are mounted on specified locations of the optical fiber cable managing device in order to save layout space of the circuit board and minimize the volume of the product. Since the housing for installing the circuit board and the optical fiber cable managing device are not described in this patent, the above cable-managing problems fail to be solved.

In addition, Taiwanese Utility Patent No. 248115 disclosed a wire managing disk. A guiding ring is formed on a first surface of the disk body. A protruding ring is formed on a second surface of the disk body. As such, the signal transmission wire could be stored and wound on the both surfaces of the disk body. The wire managing disk is integrated with the circuit board and the casing according to the usage design. Since no modular design is provided, the user fails to determine whether the opto-electronic converting module is installed or not.

In addition, Taiwanese Utility Patent No. 286376 disclosed a fiber to the home (FTTH) module. The FTTH module comprises a main body and an optical fiber cable winding disk. The optical fiber cable winding disk is pivotally coupled with the main body. As such, the optical fiber cable winding disk is permitted to be rotated and opened in order to facilitate the installing/uninstalling operation(s) of an optical network module and a media converter module. Since the optical fiber cable winding disk is a discrete component and the coupling structure of the optical fiber cable winding disk is complicated, the process of assembling the optical fiber cable winding disk is time-consuming, and the optical fiber cable winding disk is readily damaged during operation. In addition, the application of the optical fiber cable winding disk is restricted by the dimension of thereof.

Taiwanese Utility Patent No. 299444 disclosed a communication equipment converter with a cable winding function. By a cable winding member or an optical fiber cable fixing structure, the optical fiber cable could be stored on a backside plate, which may be fixed on a surface of a wall. As such, the optical fiber cable is temporarily stored. In addition, a lower cover and an upper covering plate are combined as a casing. After a circuit assembly is installed within the casing, the casing is fixed on the backside plate in a hooking manner. Although the process of installing the communication equipment converter is convenient, there are still some drawbacks. For example, since the optical fiber cable is stored and fixed on the backside plate, the processing flexibility of managing the optical fiber cable is restricted.

From the above discussions, some drawbacks are encountered from the conventional process of managing the optical fiber cable. For example, the optical fiber cable is readily damaged during the installation of the communication equipment converter. The installing process is troublesome, the structure is complicated or the layout space or resource is wasted. In addition, since the optical fiber cable is only stored at the fixed position, the installing flexibility is insufficient. Therefore, there is a need for providing an improved optical fiber communication conversion device in order to obviate the drawbacks encountered from the prior art.

SUMMARY OF THE INVENTION

It is an object of the present invention to provide a method and a device for managing an optical fiber cable of an optical fiber communication conversion device in different installing modes.

An object of the present invention provides a method and a device for managing an optical fiber cable in a simplified, space-saving and material-saving manner.

In accordance with an aspect of the present invention, there is provided an installing method of an optical fiber communication conversion device. The installing method includes the following steps. Firstly, an opto-electronic converting module with a first cable winding structure is provided, and a housing with a second cable winding structure is provided. The opto-electronic converting module with a first cable winding structure is selectively accommodated and installed within the housing. An optical fiber wiring process is performed. If the opto-electronic converting module is provided and installed within the housing and the first cable winding structure is stacked positioned upon the second winding structure, an optical fiber cable managing function is implemented by the first cable winding structure. If the opto-electronic converting module is not installed within the housing, the optical fiber cable managing function is implemented by the second cable winding structure within the housing.

In an embodiment, the optical fiber wiring process is a fiber to the home (FTTH) wiring process.

In an embodiment, the housing further includes a first perforation and/or a second perforation. An optical fiber cable is permitted to be introduced into an internal portion of the housing via the first perforation and/or the second perforation.

In an embodiment, the optical fiber wiring process further includes steps of introducing the optical fiber cable into the internal portion of the housing through the first perforation or the second perforation, and winding the optical fiber cable around the first cable winding structure.

In an embodiment, the optical fiber wiring process further includes steps of introducing the optical fiber cable into the internal portion of the housing through the second perforation, and winding the optical fiber cable around the second cable winding structure.

In an embodiment, after the optical fiber cable is wound around the second cable winding structure, the opto-electronic converting module is installed within the housing, and the optical fiber cable wound around the second cable winding structure is directly connected to the opto-electronic converting module.

In an embodiment, after the optical fiber cable is wound around the second cable winding structure, the opto-electronic converting module is installed within the housing, the optical fiber cable wound around the second cable winding structure is completely or partially removed from the second cable winding structure, and the removed portion of the optical fiber cable is then changed to be wound around the first cable winding structure.

In accordance with another aspect of the present invention, there is provided an optical fiber communication conversion device. The optical fiber communication conversion device includes a housing, an optical fiber cable, an opto-electronic converting module, a first cable winding structure and a second cable winding structure. The optical fiber cable is used for providing an optical communication signal. The opto-electronic converting module is selectively installed within the housing, wherein the opto-electronic converting module comprises a circuit board, an upper covering plate mounted upon the circuit board, and a first cable winding structure is formed upon a top surface of the upper converting plate. The first cable winding structure is formed on the opto-electronic converting module. After the opto-electronic converting module is installed within the housing, the first cable winding structure provides a function of managing the optical fiber cable. The second cable winding structure is formed on an inner surface of the housing for providing a function of managing the optical fiber cable and the second cable winding structure is positioned under the circuit board provided that the opto-electronic converting module is installed within the housing. The optical fiber cable is wound around either of the first cable winding structure or the second cable winding structure.

The opto-electronic converting module includes at least one electronic component, a circuit board and an upper covering plate. The circuit board is used for mounting the at least one electronic component. The upper covering plate is mounted on the circuit board. The first cable winding structure is formed on a top surface of the upper covering plate.

In an embodiment, the housing further includes a first perforation. After the opto-electronic converting module is installed within the housing, the optical fiber cable is introduced into an internal portion of the housing via the first perforation and wound around the first cable winding structure.

In an embodiment, the first perforation is formed in a sidewall of the housing.

In an embodiment, the at least one electronic component and the upper covering plate are mounted on the same surface of the circuit board, and plural ventilation holes are formed in the upper covering plate.

In an embodiment, the housing further includes plural engaging elements to be engaged with the circuit board.

In an embodiment, the at least one electronic component includes at least one opto-electronic signal converting element, at least one network communication element and at least one electronic communication connector. The at least one opto-electronic signal converting element is used for converting the optical communication signal into an electronic communication signal, or converting the electronic communication signal into the optical communication signal. The at least one network communication element is electrically connected to the at least one opto-electronic signal converting element for transmitting and processing the electronic communication signal. The at least one electronic communication connector is electrically connected to the network communication element for outputting and inputting the electronic communication signal.

In an embodiment, the housing includes a base and an upper cover. The base has a second perforation. The second cable winding structure is formed on an inner surface of the base. The optical fiber cable is introduced into an internal portion of the housing via the second perforation and wound around the second cable winding structure. The upper cover is pivotally coupled with the base.

In an embodiment, the opto-electronic converting module is powered by an external power source. The optical fiber communication conversion device further includes a backup power source built-in the housing. Once electricity provided by the external power source is interrupted, the opto-electronic converting module is powered by the backup power source.

In accordance with another aspect of the present invention, there is provided an optical fiber communication conversion device. The optical fiber communication conversion device includes a housing, an optical fiber cable, a cable winding structure, an opto-electronic converting module, plural engaging elements and another cable winding structure. The optical fiber cable is used for providing an optical communication signal. The cable winding structure is formed on an inner surface of the housing for providing a function of managing the optical fiber cable. The engaging elements are disposed on the inner surface of the housing, and engaged with an opto-electronic converting module. The another cable winding structure is formed on the opto-electronic converting module for providing the function of managing the optical fiber cable after the opto-electronic converting module is installed within the housing.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments.

Figure 1:
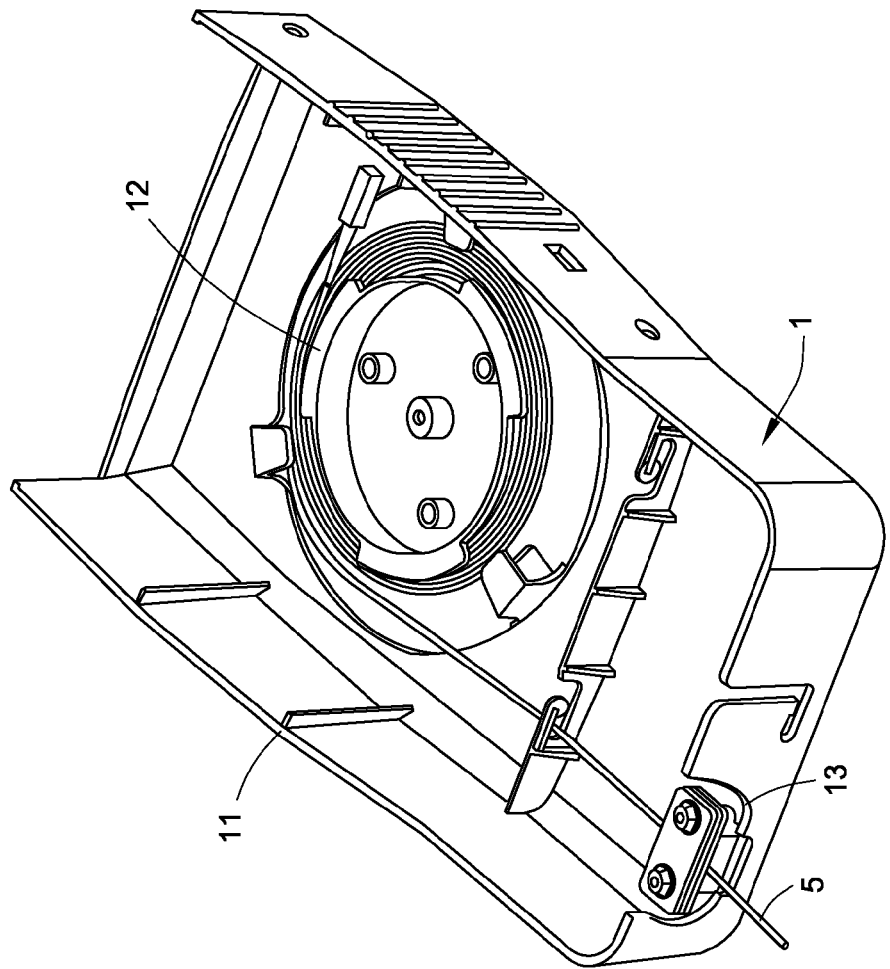
FIG. 1 is a schematic perspective view illustrating a cable manager for managing an optical fiber cable according to the prior art.
Figure 2:
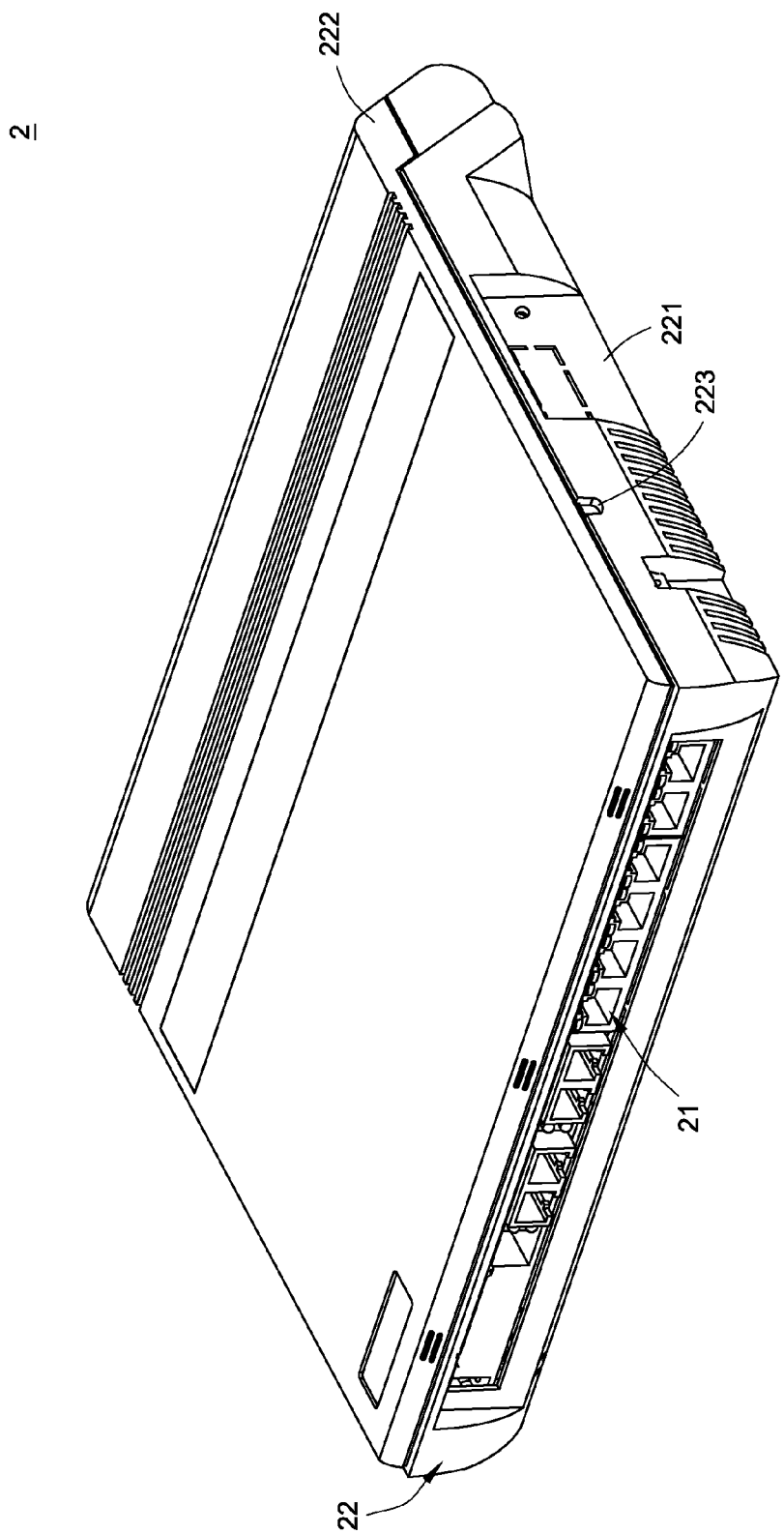
FIG. 2 is a schematic perspective view illustrating an optical fiber communication conversion device according to an embodiment of the present invention.
Figure 3:
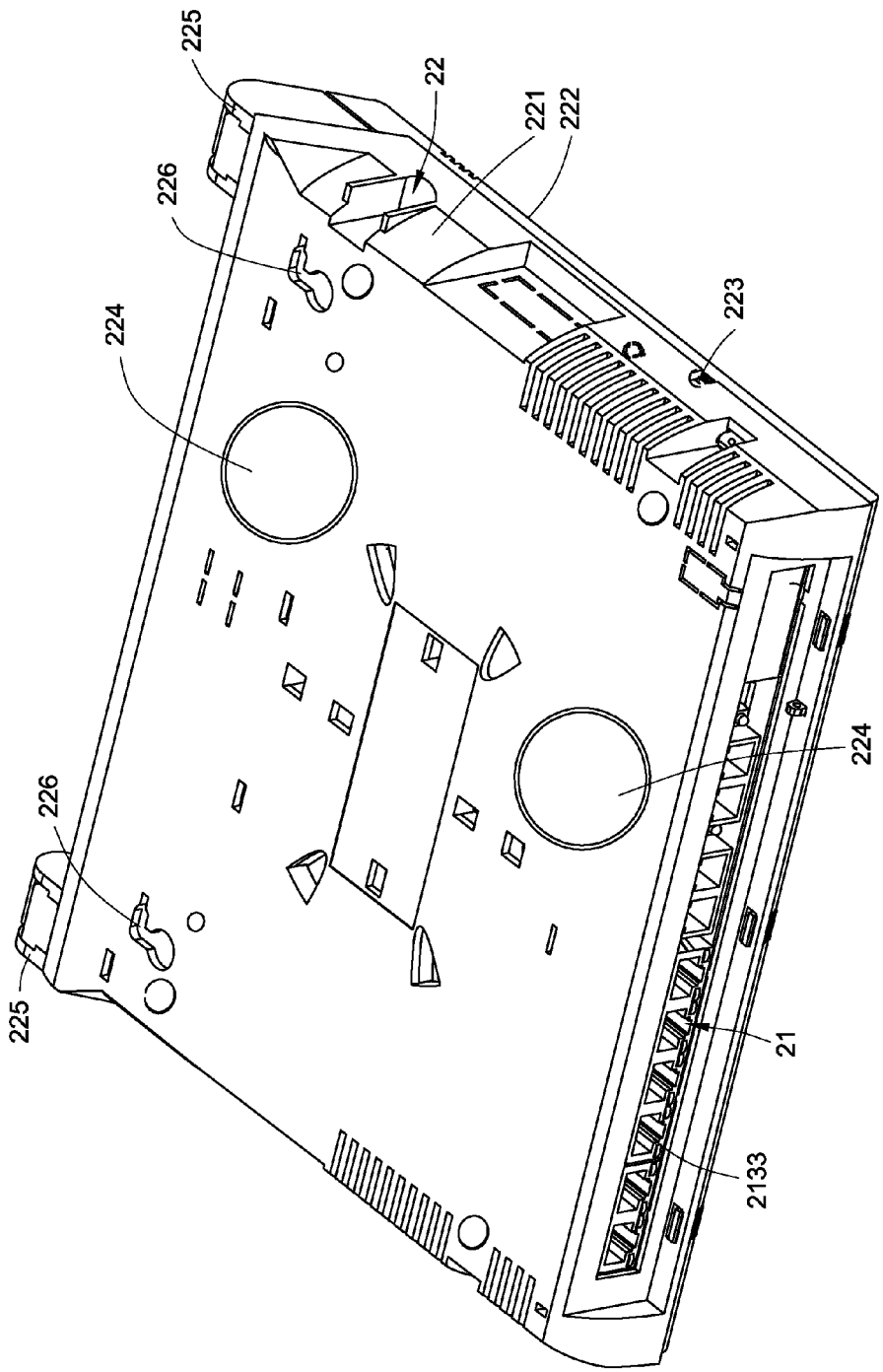
FIG. 3 is a schematic upside-down perspective view illustrating the optical fiber communication conversion device of FIG. 2.
Figure 4:
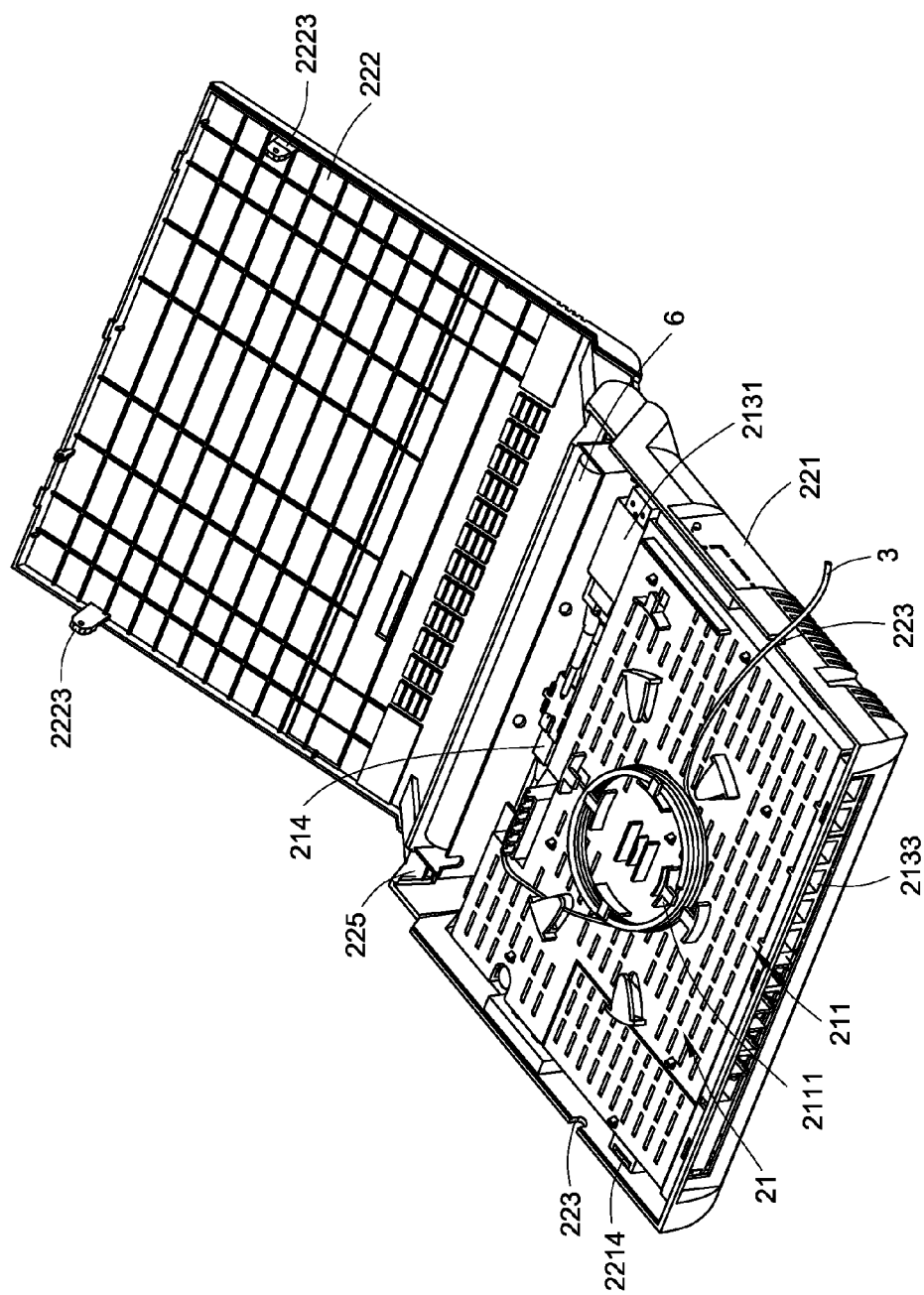
FIG. 4 is a schematic perspective view illustrating the internal portion of the optical fiber communication conversion device of FIG. 2, in which the opto-electronic converting module is shown.
Figure 5:
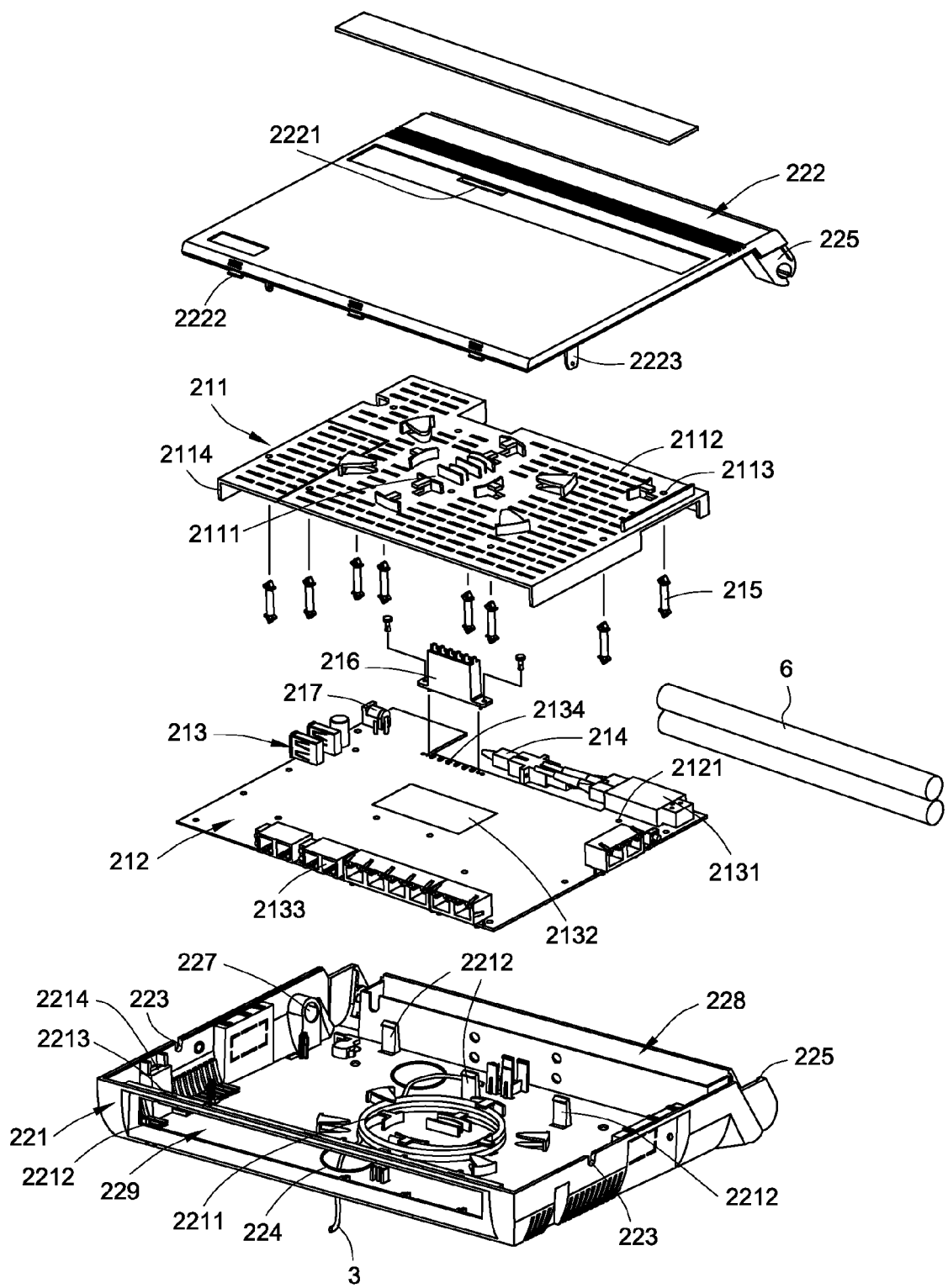
FIG. 5 is a schematic exploded view illustrating the optical fiber communication conversion device of FIG. 2.

FIG. 2 is a schematic perspective view illustrating an optical fiber communication conversion device according to an embodiment of the present invention. FIG. 3 is a schematic upside-down perspective view illustrating the optical fiber communication conversion device of FIG. 2. FIG. 4 is a schematic perspective view illustrating the internal portion of the optical fiber communication conversion device of FIG. 2, in which the opto-electronic converting module is shown. FIG. 5 is a schematic exploded view illustrating the optical fiber communication conversion device of FIG. 2.

As shown in FIGS. 2 and 3, the optical fiber communication conversion device 2 is designed for accommodating and installing an opto-electronic converting module 21. The optical fiber communication conversion device 2 has an outer housing 22.

The detailed configurations of the opto-electronic converting module 21 will be illustrated later. The housing 22 comprises a base 221 and an upper cover 222. A first perforation 223 is formed in a sidewall of the housing 22. Via the first perforation 223, an optical fiber cable (not shown) is permitted to be introduced into the internal portion of the optical fiber communication conversion device 2. A second perforation 224 is formed in a base 221. Via the second perforation 224, the optical fiber cable is also permitted to be introduced into the internal portion of the optical fiber communication conversion device 2. In addition, a fixing structure 226 is disposed in the base 221. Via the fixing structure 226, the housing 22 could be hung on a wall surface.

The base 221 and the upper cover 222 are combined together via a coupling structure 225. Via the coupling structure 225, the upper cover 222 is pivotal with respect to the base 221, and the housing 22 may be opened or closed as required. Moreover, as shown in FIG. 4, corresponding engaging elements 2214 and 2223 are respectively formed on the base 221 and the upper cover 222. As shown in FIG. 5, corresponding engaging elements 2213 and 2222 are respectively formed on the base 221 and the upper cover 222. Due to the engagement between the engaging elements 2213 and 2222 and the engagement between the engaging elements 2213 and 2222, the upper cover 222 is securely fixed on the base 221 when the upper cover 222 is closed with respect to the base 221.

Please refer to FIGS. 4 and 5 again. The opto-electronic converting module 21 comprises an upper covering plate 211, a circuit board 212 and at least one electronic component 213. The at least one electronic component 213 is mounted on the circuit board 212. The upper covering plate 211 and the electronic component 213 are mounted on the same surface of the circuit board 212. In addition, plural fixing posts 215 are arranged between the upper covering plate 211 and the circuit board 212 for fixing the upper covering plate 211 on the circuit board 212. Both ends of each fixing post 215 are penetrated through fixing holes 2113 of the upper covering plate 211 and the fixing holes 2121 of the circuit board 212.

In addition, a first cable winding structure 2111 is formed on the top surface of the upper covering plate 211 in order to provide a function of managing an optical fiber cable. In addition, due to an edge 2114 of the upper covering plate 211, the upper covering plate 211 is separated from the circuit board 212 by a gap. In addition, plural ventilation holes 2112 are formed in the surface of the upper covering plate 211.

The most basic function of the opto-electronic converting module 21 is to provide connection and signal conversion between an optical communication wire and an electronic communication wire. As shown in FIG. 4, the at least one electronic component 213 comprises at least one opto-electronic signal converting element 2131, at least one network communication element 2132 and at least one electronic communication connector 2133. The opto-electronic signal converting element 2131 is used for converting an optical communication signal into an electronic communication signal, or converting the electronic communication signal into the optical communication signal. The network communication element 2132 is electrically connected to the at least one opto-electronic signal converting element 2131 for transmitting and processing the electronic communication signal. The electronic communication connector 2133 is used for connecting the network communication element 2132 with an electronic communication wire (not shown).

In addition to the network communication signal wire, the optical fiber communication conversion device 2 may be further connected with other signal wire, for example a cable TV wire, a traditional telephone cable, or the like. For example, the optical fiber communication conversion device 2 is a residential gateway, which integrates a router, a switching hub, a cable/xDSL modem, or the like. In this situation, at least two different types of network systems are connected with each other through the optical fiber communication conversion device 2, so that the optical fiber communication conversion device 2 is served as a multi-functional platform allowing different types of network systems to be connected and collectively operated.

As shown in FIG. 5, plural electronic communication connectors 2133 arranged in a row are exposed to the outside of the housing 22 through an elongated slot 229. The electronic communication connectors 2133 include for example various network and telephone jacks, cable TV wire connectors, or the like. Via these electronic communication connectors 2133, the network wire/TV wire connecting functions and/or the telephone line in/line out functions are achievable. Accordingly, the uses of these electronic communication connectors 2133 allow the optical fiber communication conversion device 2 to be connected with the Internet, a VoIP (Voice over Internet Protocol) phone, a traditional telephone, a cable TV, or the like. In other words, various types of network services (e.g. the Internet, the traditional telephone and the cable TV network) are integrated into the optical fiber communication conversion device 2. In this embodiment, the network communication element 2132 is a discrete or integrated circuit or electronic component for implementing the above-mentioned network services, wire connecting functions, and associating signal converting functions.

Please refer to FIG. 5 again. Plural light emitting diodes 2134 are mounted on the circuit board 212 for indicating the working statuses of various functions. In addition, the working statuses of the light emitting diodes 2134 could be guided to a window 2221 of the upper covering plate 222 through a light-guiding element 216, thereby facilitating the user to view the working statuses.

Moreover, a second cable winding structure 2211 is formed on an inner surface of the base 221, so that the housing 22 also possesses optical fiber cable managing function. Please refer to FIG. 5 again. Plural engaging elements 2212 are formed within the housing 22. The engaging elements 2212 are engaged with corresponding edges of the circuit board 212, so that the circuit board 212 is combined with the housing 22. In other words, after the circuit board 212 is pushed forward to be engaged with the engaging elements 2212, the opto-electronic converting module 21 will be installed within the housing 22 without difficulty.

For maintaining normal operations of the optical fiber communication conversion device 2, the opto-electronic converting module 21 needs to be connected to an external power source (e.g. a utility power source). Please refer to FIG. 5 again. After the optical fiber communication conversion device 2 is assembled, the power connector 217 could be connected with an external power source (not shown) through a power hole 227. For maintaining normal operations of some specified functions (e.g. the IP phone) in a case of a power failure, the optical fiber communication conversion device 2 further comprises a backup power source 6 within the housing 22. Once the electricity provided by the external power source is interrupted, the opto-electronic converting module 21 is powered by the backup power source 6. An example of the backup power source 6 is a battery. The battery 6 is installed within a battery receptacle 226 so that it can be replaced conveniently when necessary.

In the above embodiments, the first cable winding structure 2111 and the second cable winding structure 2211 are respectively formed on the opto-electronic converting module 21 and the housing 22. In other words, the optical fiber cable managing function of the optical fiber communication conversion device 2 is implemented in two modes, which will be illustrated as follows.

In the first mode, the optical fiber cable managing function is implemented after the opto-electronic converting module 21 is installed within the housing 22 (see FIG. 4). That is, the optical fiber cable 3 is introduced into the internal portion of the housing 22 through the first perforation 223, and then directly wound around the first cable winding structure 2111. Since the first perforation 223 is formed in a sidewall of the housing 22 and the first cable winding structure 2111 is formed on the upper covering plate 211 of the opto-electronic converting module 21 or another proper position, the user could manage the optical fiber cable 3 after the upper cover 222 is opened. The process of managing the optical fiber cable 3 is extremely easy.

In the second mode, the optical fiber cable managing function is implemented by directly utilizing the housing 22 when the opto-electronic converting module 21 is not installed. As shown in FIG. 5, after the optical fiber cable 3 is introduced into the internal portion of the housing 22 through the second perforation 224, the optical fiber cable 3 is managed by the second cable winding structure 2211. In this situation, the housing 22 itself is served as a cable manager of the optical fiber cable 3. In a case that the user intends to install the opto-electronic converting module 21 from now on, the user may open the upper cover 222 and then allows the opto-electronic converting module 21 to be engaged with the engaging elements 2212 of the housing 22 without the need of using any installing tool. Although the housing 22 is originally served as the cable manager, it is not necessary to discard the housing or adds a new housing because the housing 22 has a function of accommodating the opto-electronic converting module 21. Moreover, even if the optical fiber cable 3 has been wound around the second cable winding structure 2211, the opto-electronic converting module 21 could be installed within the housing 22 without the need of removing the optical fiber cable 3. Meanwhile, the distal end of the optical fiber cable 3 is connected to an optical fiber connector 214 or directly connected to the opto-electronic signal converting element 2131.

Alternatively, if necessary, the optical fiber cable 3 wound around the second cable winding structure 2211 may be partially or completely removed and then wound around the first cable winding structure 2111.

As previously described, in the first mode of managing the optical fiber cable 3, the optical fiber cable 3 is introduced into the internal portion of the housing 22 through the first perforation 223. Alternatively, in the first mode of managing the optical fiber cable 3, the optical fiber cable 3 is introduced into the internal portion of the housing 22 through the second perforation 224. Please refer to FIG. 3 again. The optical fiber cable 3 is introduced into the internal portion of the housing 22 through the second perforation 224 that is closer to the fixing structure 226. After the optical fiber cable 3 is introduced into the internal portion of the housing 22 through the second perforation 224, the optical fiber cable 3 is firstly guided to a location under the opto-electronic converting module 21, then penetrated through a unsealed region between the opto-electronic converting module 21 and the housing 22, and finally managed by the first cable winding structure 2111.

Figure 6:
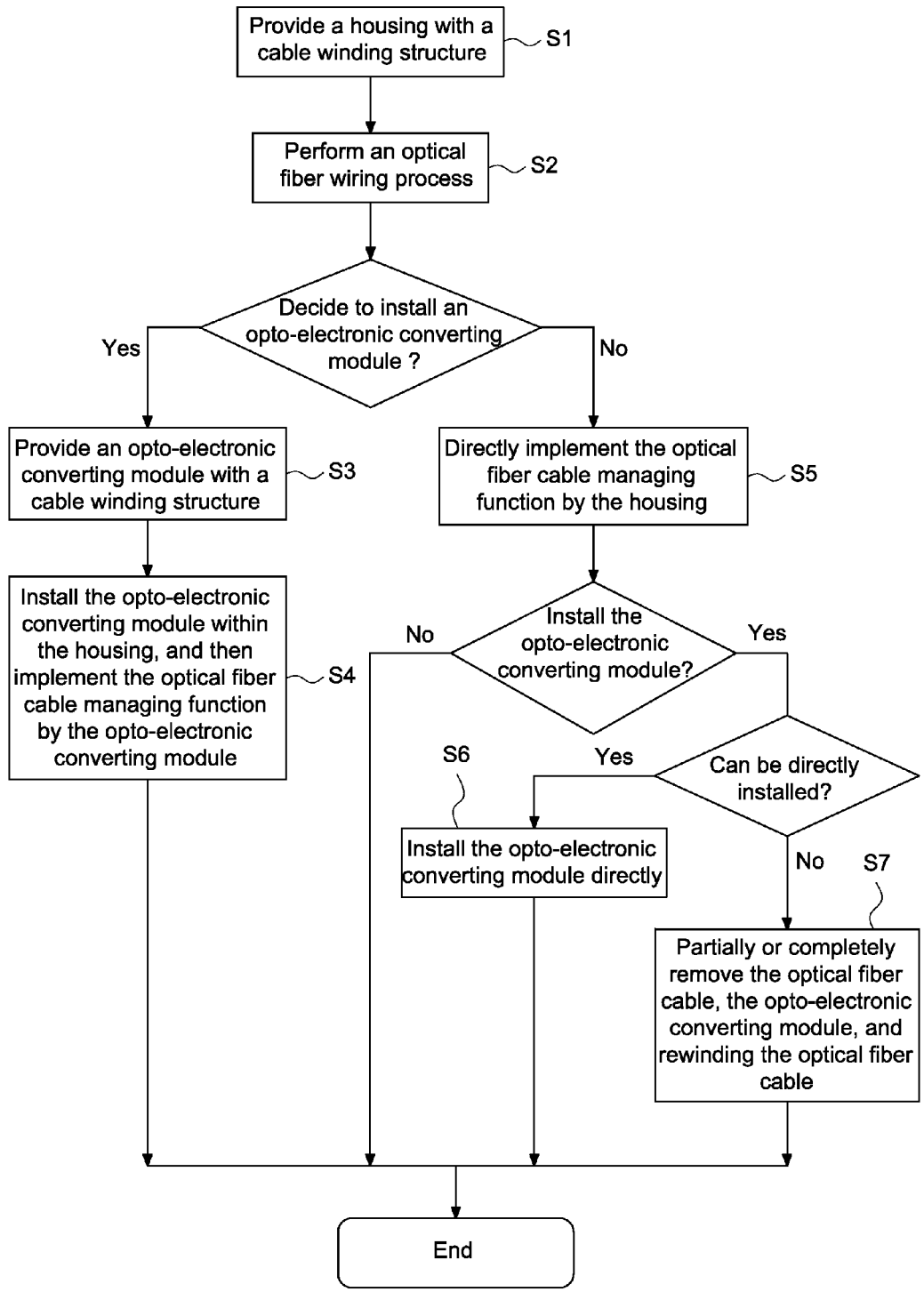
FIG. 6 is a flowchart illustrating a method of installing the optical fiber communication conversion device of the present invention.

FIG. 6 is a flowchart illustrating a method of installing the optical fiber communication conversion device of the present invention. Hereinafter, the method of installing the optical fiber communication conversion device 2 will be illustrated with reference to FIG. 6.

In the step S1, a housing with a cable winding structure is provided. For example, the housing 22 is used for managing the distal end of the surplus portion of the optical fiber cable 3 after an optical fiber wiring process is performed. In addition, the housing is capable of being used for installing the opto-electronic converting module.

In the step S2, the optical fiber wiring process is performed. The optical fiber wiring process is for example a fiber to the home (FTTH) wiring process. For wiring to each home or each user terminal, a surplus portion of the optical fiber cable 3 should be retained in order to increase the flexibility of installing the opto-electronic converting module and connecting to desired equipment. In this situation, the optical fiber cable is not usually trimmed at the construction site. After the optical fiber wiring process is performed, the process of managing the optical fiber cable and/or installing the opto-electronic converting module will be done. In accordance with the present invention, the optical fiber cable managing function of the optical fiber communication conversion device 2 is implemented in two modes by judging whether the opto-electronic converting module is installed.

In a case that the opto-electronic converting module is intended to be installed, the optical fiber cable managing function is implemented in the first mode, and the steps S3 and S4 are performed.

In the step S3, an opto-electronic converting module with a cable winding structure is provided. That is, the upper covering plate 211 is fixed on the circuit board 212 via the fixing posts 215, thereby assembling an integral opto-electronic converting module 21 (see also FIG. 5).

In the step S4, the opto-electronic converting module is installed within the housing, and then the optical fiber cable managing function is implemented by the opto-electronic converting module. For example, the opto-electronic converting module 21 is pushed forward to be engaged with the engaging elements 2212 of the housing 22, so that the opto-electronic converting module 21 is fixed within the housing 22. Meanwhile, the opto-electronic converting module 21 and the housing 22 are combined together (also see FIG. 4). Then, the optical fiber cable 3 is introduced into the internal portion of the housing 22 through the first perforation 223 or the second perforation 224, and wound around the first cable winding structure 2111. Afterwards, the distal end of the optical fiber cable 3 is connected to the optical fiber connector 214. Meanwhile, the installing process is completed.

In a case that the user has not decided to install the opto-electronic converting module, the optical fiber cable managing function will be implemented in the second mode, and the following steps are performed.

In the step S5, the optical fiber cable managing function is directly implemented by the housing. If the opto-electronic converting module 21 is not installed within the housing 22, the optical fiber cable 3 is introduced into the internal portion of the housing 22 through the second perforation 224 and then wound around the second cable winding structure 2211. After the optical fiber cable 3 is wound around the second cable winding structure 2211, the upper cover 222 is closed with respect to the base 221. Meanwhile, the optical fiber cable 3 is well accommodated within the housing 22.

The wiring process in the second mode may be completed after the step S5. In a case that the user intends to install the opto-electronic converting module 21 from now on, the steps S6 and S7 are performed.

In the step S6, the opto-electronic converting module is directly installed.

In most situations, the optical fiber cable 3 wound around the second cable winding structure 2211 does not need to be removed. After the opto-electronic converting module 21 is installed within the housing 22, the distal end of the optical fiber cable 3 is connected to an optical fiber connector 214 or directly connected to the opto-electronic signal converting element 2131.

In the step S7, the optical fiber cable is partially or completely removed, then the opto-electronic converting module is installed, and finally the optical fiber cable is rewound. For example, after the optical fiber cable 3 wound around the second cable winding structure 2211 is partially or completely removed, the opto-electronic converting module 21 is installed within the housing 22. Then, the optical fiber cable 3 is wound around the first cable winding structure 2111. Afterwards, the distal end of the optical fiber cable 3 is connected to an optical fiber connector 214 or directly connected to the opto-electronic signal converting element 2131.

The sequence of the steps S1~S7 may be adjusted according to the practical requirements. In the above flowchart, the step S1 of providing the housing is prior to the step S2 of performing the optical fiber wiring process. Nevertheless, the step of providing the housing is not necessarily prior to the step of performing the optical fiber wiring process.

Moreover, the steps S3 and S4 of providing the opto-electronic converting module are followed by the step S1 of providing the housing with the cable winding structure. Nevertheless, the opto-electronic converting module may be previously installed within the housing.

Since the optical fiber cable is readily damaged by the pulling, bending or pressing action, the house 22 may be previously fixed at the installing location before the optical fiber wiring process is performed. For example, the housing 22 may be hung on a wall surface via the fixing structure 226 (see FIG. 3) before the optical fiber wiring process is performed.

For enhancing the flexibility of selecting the installing position, more than one first perforation 223 or more than one second perforation 224 may be previously formed on various positions of the housing 22. For example, as shown in FIG. 4, two first perforations 223 are respectively formed in bilateral sides of the housing 22. For managing the optical fiber cable 3, the optical fiber cable 3 may be introduced into the internal portion of the housing 22 through any of the first perforation 223. Alternatively, as shown in FIG. 3, two or more circular holes (i.e. the second perforations 224) are previously formed in the base 221. For managing the optical fiber cable 3 by the second cable winding structure 2211, the optical fiber cable 3 may be introduced into the internal portion of the housing 22 through any of the second perforations 224.

From the above descriptions, since the optical fiber cable of the optical fiber communication conversion device of the present invention could be managed in two different installing modes, the optical fiber communication conversion device has two different installing configurations. In accordance with the present invention, the functions of integrating a cable manager and installing an opto-electronic converting module are achieved. As such, during the optical fiber wiring process, the procedure of installing the opto-electronic conversion device (e.g. a residential gateway) is largely simplified. In addition, the wiring process and the space utilization become more succinct. Moreover, the possibility of damaging the optical fiber cable is minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An installing method of an optical fiber communication conversion device, said installing method comprising steps of:

providing a housing, wherein an opto-electronic converting module with a first cable winding structure is selectively accommodated and installed within said housing; and performing an optical fiber wiring process, wherein if said opto-electronic converting module is provided and installed within said housing, an optical fiber cable managing function is implemented by said first cable winding structure, wherein if said opto-electronic converting module is not installed within said housing, said optical fiber cable managing function is implemented by a second cable winding structure within said housing.

2. The installing method of an optical fiber communication conversion device according to claim 1 wherein said optical fiber wiring process is a fiber to the home (FTTH) wiring process.

3. The installing method of an optical fiber communication conversion device according to claim 1 wherein said housing further comprises a first perforation and/or a second perforation, wherein an optical fiber cable is permitted to be introduced into an internal portion of said housing via said first perforation and/or said second perforation.

4. The installing method of an optical fiber communication conversion device according to claim 3 wherein said optical fiber wiring process further comprises steps of introducing said optical fiber cable into said internal portion of said housing through said first perforation or said second perforation, and winding said optical fiber cable around said first cable winding structure.

5. The installing method of an optical fiber communication conversion device according to claim 3 wherein said optical fiber wiring process further comprises steps of introducing said optical fiber cable into said internal portion of said housing through said second perforation, and winding said optical fiber cable around said second cable winding structure.

6. The installing method of an optical fiber communication conversion device according to claim 5 wherein after said optical fiber cable is wound around said second cable winding structure, said opto-electronic converting module is installed within said housing, and said optical fiber cable wound around said second cable winding structure is directly connected to said opto-electronic converting module.

7. The installing method of an optical fiber communication conversion device according to claim 5 wherein after said optical fiber cable is wound around said second cable winding structure, said opto-electronic converting module is installed within said housing, said optical fiber cable wound around said second cable winding structure is completely or partially removed from said second cable winding structure, and the removed portion of said optical fiber cable is changed to be wound around said first cable winding structure.

* * * * *